Nov. 4, 1930.                    K. DANKER                    1,780,518
ARMORED CAR
Filed May 7, 1929
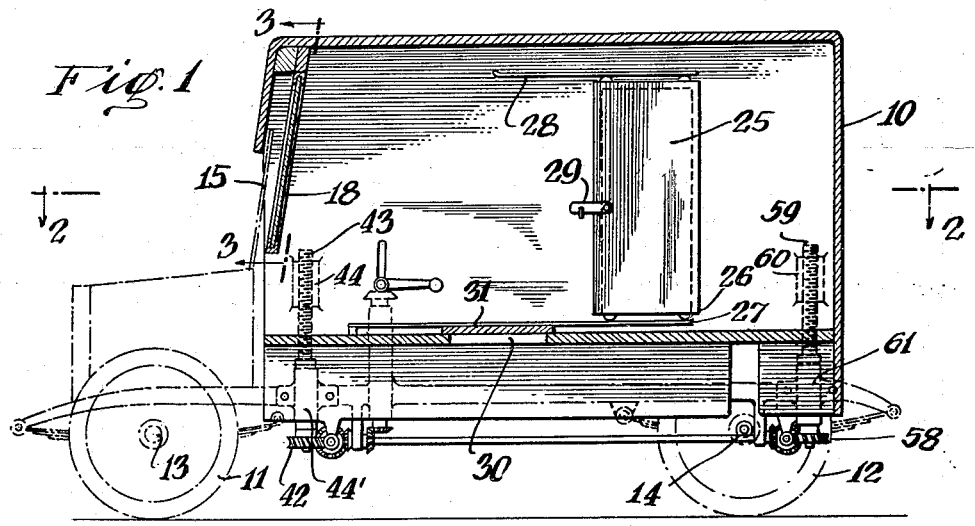
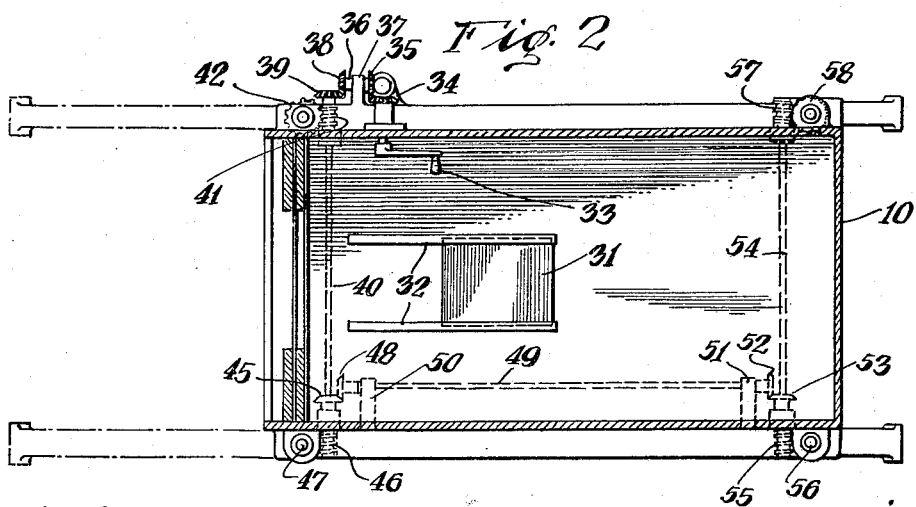
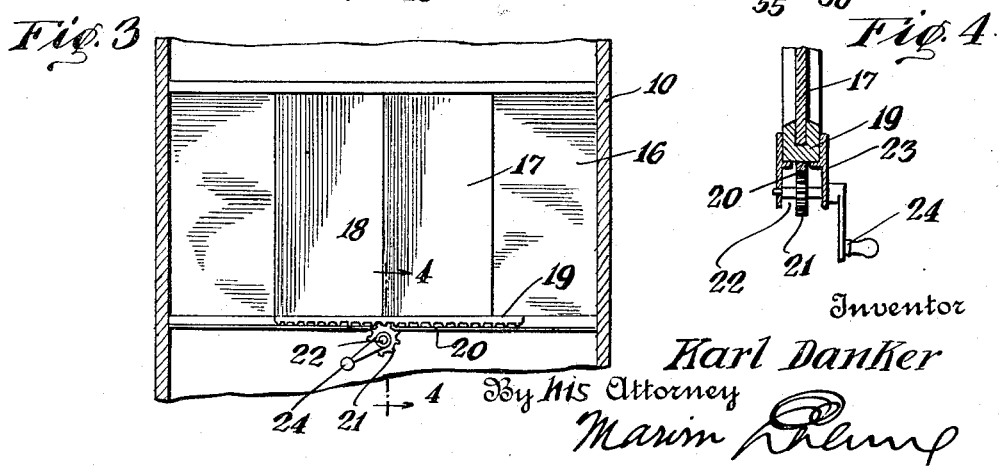
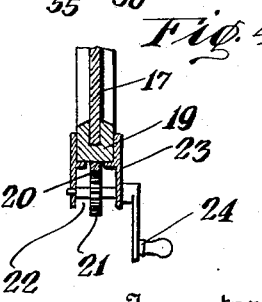

Patented Nov. 4, 1930

1,780,518

UNITED STATES PATENT OFFICE

KARL DANKER, OF NEW YORK, N. Y.

ARMORED CAR

Application filed May 7, 1929. Serial No. 361,149.

This invention relates to improvements in armored cars for the transport of valuables or money, and it is the principal object of my invention to provide a car the walls of the body of which are bullet-proof, and the body of which can be lowered by suitable mechanism operated from within the car.

Another object of my invention is the provision of an armored car, the windshield of which can be protected by bullet-proof shutters, operated from the inside of the car.

A further object of my invention is the provision of an armored car the mechanism for lowering and raising the body thereof is located within the car and can readily be operated in cases of emergency.

A still further object of my invention is the provision of an armored car having an opening in its bottom, protected by an armored slide and allowing a taking in and discharging of any load through the bottom unobserved by outsiders.

These and other objects of my invention will become more fully known as the description proceeds, and will then be specifically defined in the appended claims.

In the accompanying drawing, forming a material part of this disclosure:

Fig. 1 is a sectional side elevation of an armored car constructed according to my invention.

Fig. 2 is a top plan view thereof in section on line 2—2 of Figure 1.

Fig. 3 is an inner elevation of the windshield seen in the direction of arrows 3—3 of Figure 1.

Fig. 4 is a section on line 4—4 of Figure 3.

As illustrated, the armored car according to my invention has a body of metal walls 10 resting on the usual truck supported by the wheels 11 and 12 on axles 13 and 14 respectively.

The windshield 15 in its frame 16 can be protected by metal shutters 17, 18 resting on a frame 19 having a rack 20 formed on its underside, adapted to be engaged by a gear 21 on a shaft 22 journalled in suitable bearing brackets 23 and extending therefrom within the car where it carries the operating handle 24.

A metal sliding door 25 guided by rollers 26 between rails 27, 28, within the car body can be locked on the inside by a suitable locking device 29.

The bottom of the car body has an opening 30 formed therein adapted to be closed by a trap door 31 sliding between suitable guides 32.

The entire body can be lowered from the inside of the car by the operation of handle 33 on a shaft carrying a bevel gear 34 on its outer end in mesh with a bevel gear 35 on a shaft 36 journalled in and extending through a bracket 37 and carrying at its other end a bevel gear 38 in mesh with a bevel gear 39, on a shaft 40, which carries also a worm 41 in mesh with a worm 42 at the lower end of a screw 43 having a head 44, and guided in a suitable socket 44'.

Shaft 40 carries within the car a bevel gear 45, and on its outer end a worm 46 in mesh with a worm 47.

Bevel gear 45 is in mesh with a bevel gear 48 at the end of a shaft 49 journalled within the car in brackets 50, 51.

The opposite end of shaft 49 carries also a bevel gear 52 in mesh with a bevel gear 53 on a shaft 54 which also carries a worm 55 in mesh with a worm 56, and at its opposite end a worm 57 in mesh with a worm 58 at the lower end of a screw 59 having a head 60 and displaceable vertically in a suitable socket 61.

The operation of my device will be entirely clear from the above description and by simultaneous inspection of the drawing.

In cases of danger, the sliding door 25 is closed from the inside, and the windshield shutters are closed by the proper operation of handle 24, while the proper operation of handle 33 will lower the body by the intermediary of the bevel gears, worms and screw mechanism, so that any load can be taken in or removed through trap door 31 unobserved by outsiders.

It will be understood that I have in this manner produced a serviceable armored car proof against any attack by robbers or the like, and allowing a loading and unloading unobserved from the outside and that I may make such changes as come within the scope of the appended claims, without departure from the invention.

Having thus described my invention, what I claim as new, and desire to secure by Letters Patent is:

1. In an armored car of the class described, a windshield, a means for protecting said windshield in case of danger, said means comprising a pair of shutters, frames therefor, a rack on said frame, a gear in mesh with said rack, and an operating handle within the car to close said shutters behind the windshield.

2. In an armored car having a windshield and means for lowering and elevating the armor, a means for protecting the windshield said means comprising a pair of shutters adapted to close over the windshield from opposite ends thereof, a frame on which said shutters rest with their lower edges, a rack formed on the underside of said frame, a gear in mesh with said rack, a shaft for said gear, bearing brackets on which said shaft is journaled, said shaft extending into the car and an operating handle on said shaft for closing and opening said shutters by the intermediary of said gear and rack.

In witness whereof I have signed my name to this specification.

KARL DANKER.